United States Patent [19]

Bilen

[11] Patent Number: 4,544,393
[45] Date of Patent: Oct. 1, 1985

[54] ROTARY FIBER FORMING METHOD AND APPARATUS

[75] Inventor: Roger J. Bilen, Newark, Ohio

[73] Assignee: Owens-Corning Fiberglas Corporation, Toledo, Ohio

[21] Appl. No.: 612,774

[22] Filed: May 22, 1984

[51] Int. Cl.⁴ ............................................. C03B 37/04
[52] U.S. Cl. .............................................. 65/6; 65/14
[58] Field of Search ........................................ 65/6, 14

[56] References Cited

U.S. PATENT DOCUMENTS

| | | |
|---|---|---|
| 3,007,196 | 5/1958 | Levecque . |
| 3,215,514 | 5/1962 | Levecque . |
| 3,233,990 | 2/1966 | Stephens et al. ................ 65/14 X |
| 3,393,986 | 7/1968 | Firnhaber ........................ 65/6 |
| 3,622,293 | 11/1971 | Firnhaber ...................... 65/6 X |
| 3,649,234 | 3/1972 | Charpentier . |
| 4,046,539 | 9/1977 | Pitt . |
| 4,302,234 | 11/1981 | Guffey et al. .................. 65/6 X |
| 4,303,430 | 12/1981 | Houston ........................... 65/6 |

FOREIGN PATENT DOCUMENTS

| 137945 | 7/1947 | Australia ........................ 65/6 |
| 925185 | 5/1963 | United Kingdom .............. 65/14 |

Primary Examiner—Robert Lindsay
Attorney, Agent, or Firm—Ronald C. Hudgens; Ted C. Gillespie

[57] ABSTRACT

A method and apparatus for centrifugal production of fibers comprises a rotatably mounted spinner for centrifuging streams of molten material and an annular blower for discharging attenuating gases having a component in a tangential direction opposite the direction of rotation of the spinner, and one or more turbulence generating members positioned beneath the spinner and mounted for rotation therewith.

11 Claims, 7 Drawing Figures

U.S. Patent  Oct. 1, 1985  Sheet 1 of 2  4,544,393
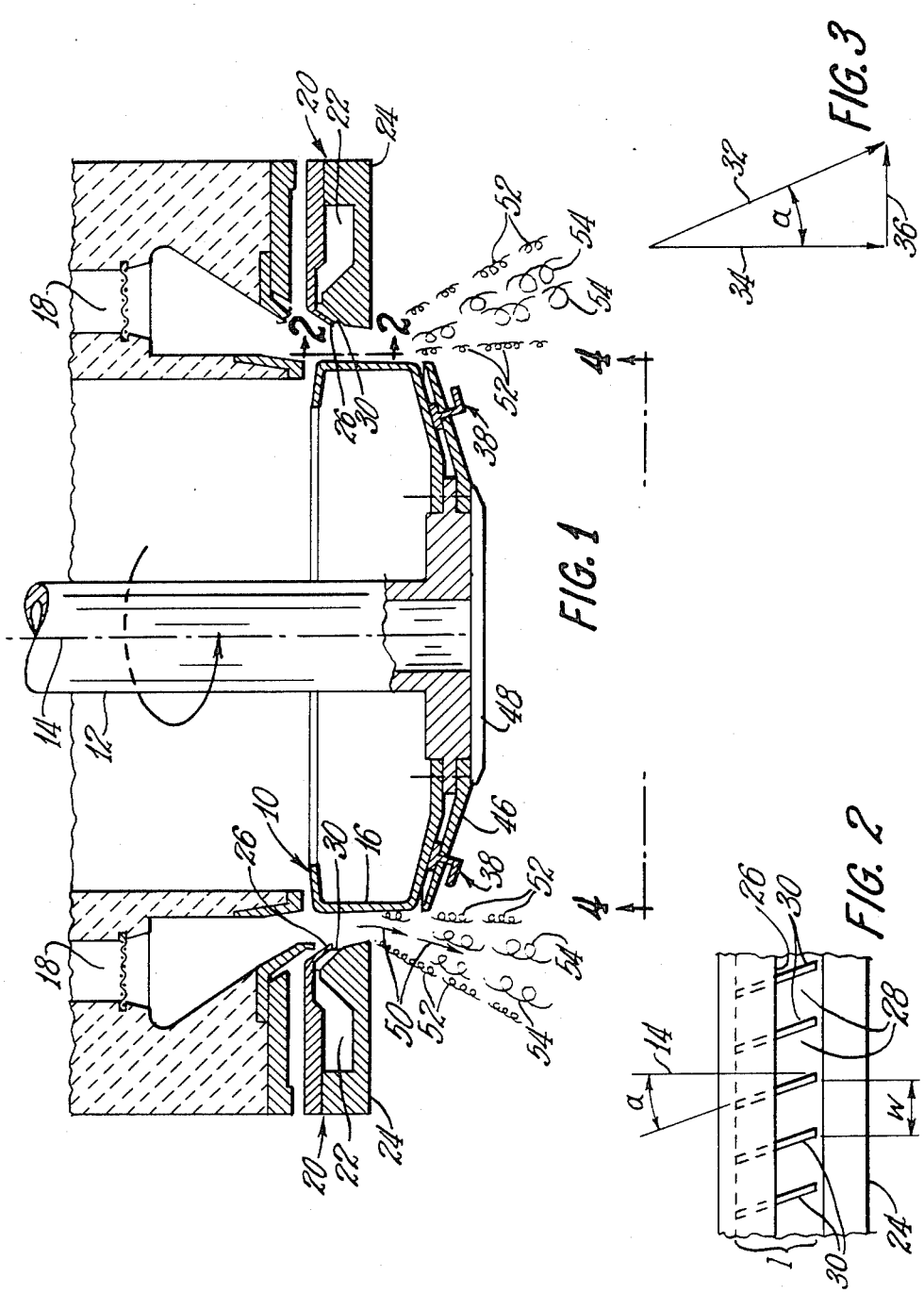

ROTARY FIBER FORMING METHOD AND APPARATUS

TECHNICAL FIELD

This invention pertains to fiberizers for attenuating fibers. In one of its more specific aspects, this invention pertains to annular blowers suitable for attenuating fibers centrifuged from a rotating spinner. In another of its more specific aspects, this invention pertains to means for incresing the turbulence surrounding centrifuged fibers in order to break the fibers into shorter lengths. A particular application for the invention is in the attenuation of glass fibers.

BACKGROUND OF THE INVENTION

The production of glass fibers by means of a rotary process is well know. In general, molten glass is fed into the spinner which revolves at high speeds. The spinner has a solid lower surface and a peripheral wall containing a multiplicity of orificies. The glass is passed by centrifugal force through the orifices of the peripheral wall in the form of small diameter streams. Positioned circumferentially about the spinner is an annular blower. The blower typically comprised an annular manifold and a discontinuous slot or series of slots for directing a plurality of gaseous jets from the manifold in a downward column or circumferential array. Usually the blowers are supplied with attenuating air by a compressor. The gases discharged from the blower have a pulling effect on the fibers being centrifuged, and the gases serve to attenuate the fiber to its final small diameter.

In a typical blower construction, the discontinuous slot is comprised of downwardly directed openings communicating with the manifold. These openings typically have a square cross section, being, for example, 0.02 inches by 0.02 inches. Also, the lands or blower fins between the openings are typically of the same cross-sectional dimension, 0.02 inches by 0.02 inches. Typically, the height dimension is about four times the width dimension. The blower slots or openings are invariably oriented generally parallel to the axis of rotation of the spinner, which is usually in the downward direction.

It is generally desirable to produce products of fibrous glass and other mineral fibers having the greatest possible strength properties while using the least amount of glass fibers. In certain heavy density fibrous glass products, having a density within the range of from about 1.5 pounds per cubic foot (pcf) to about 10 pcf, products could be made more cheaply, with less glass and less binder, by using shorter and fatter glass fibers than had been heretofore employed. Such heavy density products for which shorter, fatter fibers would be advantageous are commercial ceiling products and roof deck insulation products. The shorter, fatter fibers are particularly advantageous for commercial roof deck products because of the requirement that the flute span test be met.

Heretofore, efforts to make shorter, fatter fibers for uses in heavy density products have not been successful. Attempts to make fatter fibers have usually resulted in creation of longer rather than shorter fibers. Thus, there is a need for a method for making shorter, fatter fibers.

STATEMENT OF THE INVENTION

The solution to the problem of manufacturing shorter, fatter fibers has now been developed. Fibers are produced through centrifuges with larger than standard sized orifices, thereby producing fatter fibers. Also, a region of greater turbulence than heretofore employed in glass fiberization processes is positioned in the path of the fibers to cause the fibers to be broken into shorter lengths.

According to this invention, there is provided apparatus for centrifugal production of fibers comprising a rotatably mounted spinner adapted with an orificed peripheral wall through which streams of molten material are centrifuged, an annular blower surrounding the spinner for attenuating the streams into fibers, the blower adapted with openings directed generally parallel to the axis of rotation of the spinner, but having a component in the tangential direction with respect to the peripheral wall, the component being opposite the direction of rotation of the spinner, and the openings being at an angle to the axis within the range of from about 2 degrees to about 45 degrees.

According to this invention, there is also provided apparatus for centrifugal production of fibers comprising a rotatably mounted spinner adapted with an orificed peripheral wall through which streams of molten material are centrifuged, a blower surrounding the spinner for directing the centrifuged material as fibers generally parallel to the axis of rotation of the spinner, and one or more turbulence generating members positioned beneath the spinner and mounted for rotation therewith to increase the turbulence in a locus radially outward from and beneath the spinner.

It has been found that increased turbulence can be established by orienting the direction of the flow of attenuating gases from the blower to be counter to the direction of rotation of the spinner, thereby causing the fibers to break up into shorter fibers. The method and apparatus of this invention have been found to enable a reduction in the fibers to a length of about 2 to 3 inches from a previous drape length of about 8 to 10 inches. The resulting shorter, fatter fiber has enabled the production of commerical roof deck insulation at an approximate 5 percent reduction in density: the standard insulation board is 7.6 pcf, whereas, the equivalent strength insulation board produced according to the method of this invention has a density of 7.2 pcf. Also, the shorter, fatter fiber enables a reduction in the amount of binder required for bonding the fibers and the product together. The binder savings have been found to be on the order of about 14 percent, from about 14 weight percent with the prior art process to about 12 weight percent with the process of this invention. The product made by this invention has a greater uniformity in binder distribution and weight distribution across the width of the product.

In a specific embodiment of the invention the angle between the direction of blower gases and the axis of the spinner is within the range of from about 5 degrees to about 20 degrees.

In a preferred embodiment of the invention the angle is about 10 degrees.

In another preferred embodiment of the invention the height-to-width aspect ratio is within the range of from about 4 to about 40, and most perferably about 19. It has been found that the higher height-to-width aspect ratio enhances the ability of the blower to create turbulence.

In another preferred embodiment of the invention, the turbulence generating members are concave in the direction of rotation of the spinner.

In the most preferred embodiment of the invention, the turbulence generating members are mounted on a radiation shield positioned beneath the spinner.

According to this invention, there is also provided a method for centrifugal production of fibers comprising rotating a spinner adapted with an orificed peripheral wall to centrifuge streams of molten material, and attenuating the streams into fibers with an annular blower surrounding the spinner by directing gas flows from openings in the blower, the gas flows being directed generally parallel to the axis of rotation of the spinner, but having a component in the tangential direction with respect to the peripheral wall, the component being opposite the direction of rotation of the spinner, and the gas flows being at an angle to the axis within the range of from about 2 degrees to about 45 degrees.

According to this invention, there is also provided a method for centrigual production of fibers comprising rotating a spinner adapted with an orificed peripheral wall to centrifuge streams of molten material, and directing the centrifuged material as fibers generally parallel to the axis of rotation of the spinner with an annular blower surrounding the spinner, and increasing the turbulence in a locus radially outward from and beneath the spinner by rotating one or more turbulence generating members beneath the spinner.

DESCRIPTION OF THE DRAWINGS

FIG. 1 is a schematic cross section view in elevation of a fiber forming spinner and blower according to the principles of this invention.

FIG. 2 is a schematic view in elevation of the blower taken along lines 2—2 of FIG. 1.

FIG. 3 is a schematic diagram of the direction of flow of gases from the blower.

DESCRIPTION OF THE INVENTION

Figure 4:
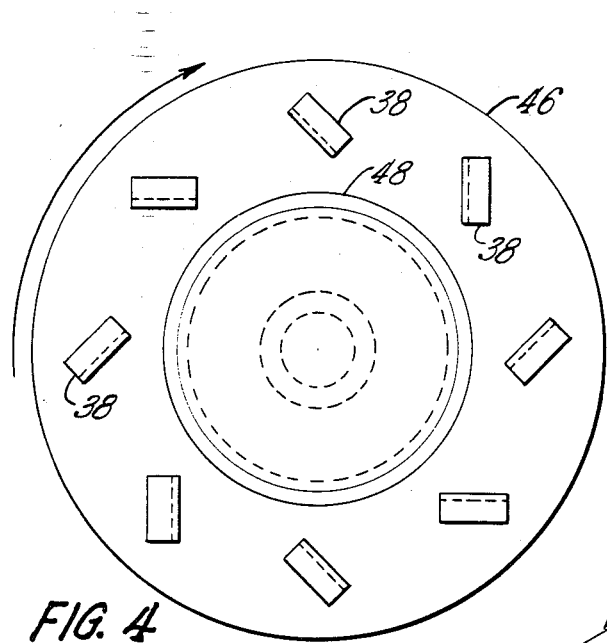
FIG. 4 is a schematic upward plan view of the bottom of the spinner along lines 4—4 of FIG. 1.

This invention will be described in terms of a glass fiber forming and attenuating process, although it is to be understood that the process is suitable for fibers of other materials, particularly of other mineral material such as rock, slag, and basalt.

As shown in FIG. 1 spinner 10 is mounted for rotation on quill 12 about spinner axis 14. The spinner has orificed side-wall 16, suitable for emanating molten streams of glass by centrifugation. A typical prior art roof insulation spinner has about 7000 orifices with diameters of about 0.035 inches. The spinner of this invention preferably has about 2500 orifices, with diameters within the range of from about 0.040 to about 0.050 inches, and, most preferably about 0.045 inches.

Annular burner 18 can be positioned around the spinner for maintaining the molten streams in an attenuable condition for further attenuation, as is well known in the art. Surrounding the spinner is annular blower 20 which attenuates the molten streams into fibers. In some low energy processes the blower will not effect further attenuation of the fibers, but will merely direct the centrifuged fibers downwardly, generally parallel to the axis of rotation of the spinner. The blower is comprised of manifold 22 which is defined by blower bottom casing 24 and blower top flange 26. The blower top flange and the blower bottom casing form a generally annular exit of gases from the burner comprised of a series of openings or slots 28 and lands or blower fins 30 positioned between the openings.

As shown in FIG. 2, the slots defined by the blower fins are at an angle "alpha" to the spinner axis, the angle being with the range of from about 2 degrees to about 45 degrees. Preferably, the angle is within the range of from about 5 degrees to about 20 degrees, and in the preferred embodiment, the angle is about 10 degrees. As shown in FIG. 2, the slots have height h and width w. The height-to-width aspect ratio is preferably within the range of from about 4 to about 40. In the most preferred embodiment, the height-to-width aspect ratio is about 19.

As shown in FIG. 3 the slot orientation is indicated by vector 32, and this vector is comprised of a component in the axial direction, vector 34, and tangential component 36, which is opposite the direction of rotation of the spinner. Vectors 32 and 34 form the angle "alpha".

Figure 5:
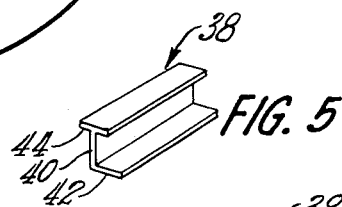
FIG. 5 is perspective view of a fin useful as a turbulence generating member according to this invention.
Figure 6:
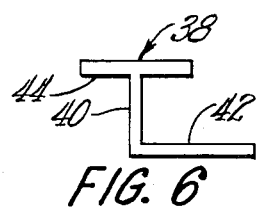
FIG. 6 is a schematic view in elevation of a fin of FIG. 5.

The fiberizer is preferably adapted with turbulence generating members positioned beneath the spinner and mounted for rotation therewith to increase the turbulence in a locus radially outward from and beneath the spinner in order to break up the fibers. The turbulence generating members can be members of any size or shape suitable for generating turbulent flow in the path of the fibers, such as fins 38. As shown in FIG. 4, the fins can be oriented at some angle, such as a 45 degree angle, to a spinner radius in order to present the broadest possible profile during rotation. As shown in FIGS. 5 and 6, the fins employed in the preferred embodiment are angle-shaped members having vertical neck 40 and horizontal flange 42. For ease of mounting, the flanges can be provided with a tee cross piece, such as tee cross piece 44 for mounting the fins in the appropriate mounting means.

In the preferred embodiment a fin mounting means, such as radiation shield 46, is positioned beneath the spinner. This means can also retard the cooling of the spinner. As shown, the radiation shield can be mounted in place by any suitable member, such as mounting nut 48.

In the absence of turbulence generating members, the gases from the burner and the gases from blower sweep past the spinner peripheral wall in the direction shown by arrows 50 in FIG. 1. As these gases flow past the blower bottom casing and spinner, their speed decays, creating small eddies 52 of turbulent flow in the edges of the flow regime through which the fibers pass. The presence of the turbulence generating members, such as the fins, creates a broader regime of turbulent flow, such as large eddies 54, which are in the path of the fibers being carried by the flow of gases, i.e., which are at a locus radially outward from, and beneath, the spinner. It is believed that these large eddies are responsible for breaking the fiber into shorter lengths.

Figure 7:
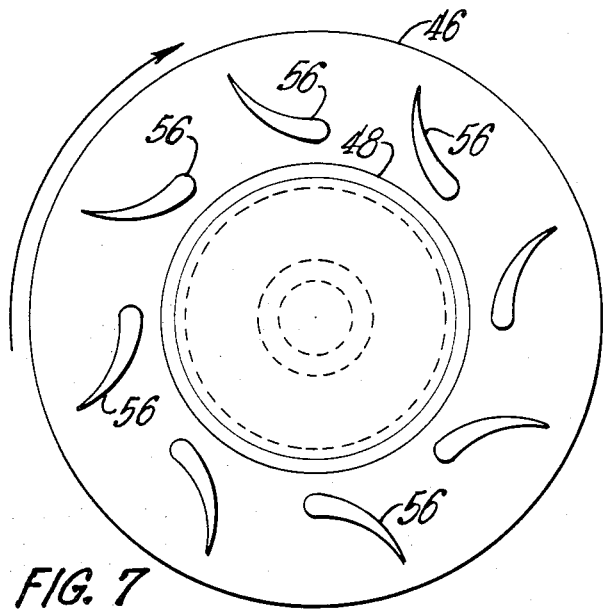
FIG. 7 is a schematic view similar to that in FIG. 4, but utilizing concave-shaped members as the turbulence generating members.

As shown in FIG. 7, other shapes of turbulence generating members can be employed, such as concave-shaped members 56 which protrude from the surface of the radiation shield.

It will be evident from the foregoing that various modifications can be made to this invention. Such, however, are considered as being within the scope of the invention.

INDUSTRIAL APPLICABILITY

This invention will be found to be useful in the production of glass fibers for such uses as thermal insulation and acoustical insulation products.

I claim:

1. Apparatus for centrifugal production of fibers comprising a rotatably mounted spinner adapted with an orificed peripheral wall through which streams of molten material are centrifuged, a blower surrounding said spinner for directing the centrifuged material as fibers generally parallel to the axis of rotation of said spinner, and one or more turbulence generating members positioned beneath said spinner and mounted for rotation therewith to increase the turbulence in a locus radially outward from and beneath said spinner, said turbulence generating members being concave in the direction of roatation of said spinner.

2. Apparatus for centrifugal production of fibers comprising a rotatably mounted spinner adapted with an orificed peripheral wall through which streams of molten material are centrifuged, an annular blower surrounding said spinner for attenuating said streams into fibers, said blower adapted with openings directed generally parallel to the axis of rotation of said spinner, but having a component in the tangential direction with respect to said peripheral wall, the component being oppsite the direction of rotation of said spinner, and the openings being at an angle to said axis within the range of from about 2 degrees to about 45 degrees, and one or more turbulence generating members positioned beneath said spinner and mounted for rotation therewith to increase the turbulence in a locus radially outward from and beneath said spinner, said turbulence generating members being concave in the direction of rotation of said spinner.

3. The apparatus of claim 2 in which said angle is within the range of from about 5 degrees to about 20 degrees.

4. The apparatus of claim 2 in which said openings have a height-to-width ratio within the range of from about 4 to about 40.

5. A method for centrifugal production of fibers comprising rotating a spinner adapted with an orificed peripheral wall to centrifuge streams of molten material, and directing the centrifuged material as fibers generally parallel to the axis of rotation of said spinner and increasing the turbulence in a locus radially outward from and beneath said spinner by rotating one or more turbulence generating members beneath said spinner, said turbulance generatng members being concave in the direction of rotation of said spinner.

6. A method for centrifugal production of fibers comprising rotating a spinner adapted with an orificed peripheral wall to centrifuge streams of molten material, and attenuating said streams into fibers with an annular blower surrounding said spinner by directing gas flows from openings in said blower, said gas flows being directed generally parallel to the axis of rotation of said spinner, but having a component in the tangential direction with respect to said peripheral wall, the component being opposite the direction of rotation of said spinner, and the gas flows being at an angle to said axis within the range of from about 2 degrees to about 45 degrees, and increasing the turbulence in a locus radially outward from and beneath said spinner by rotating one or more turbulence generating members beneath said spinner, said turbulence generating members being concave in the direction of rotation of said spinner.

7. The method of claim 6 in which said angle is within the range of from about 5 degrees to about 20 degrees.

8. The method of claim 7 in which said angle is about 10 degrees.

9. The apparatus of claim 1 in which said turbulence generating members are oriented at a 45 degree angle to a spinner radius, thereby presenting the broadest possible profile during rotation.

10. The apparatus of claim 1 in which said turbulence generating members comprise fins which are angle-shaped and which have a vertical neck and a horizontal flange.

11. The apparatus of claim 2 in which said turbulence generating members are mounted on a radiation shield positioned beneath said spinner.

* * * * *